(12) United States Patent
Bluestone

(10) Patent No.: US 12,395,206 B2
(45) Date of Patent: Aug. 19, 2025

(54) PARASITIC TOLERANT CHARGE-BASED COUPLING MEASUREMENT

(71) Applicant: The Boeing Company, Arlington, VA (US)

(72) Inventor: Aaron James Bluestone, Camarillo, CA (US)

(73) Assignee: THE BOEING COMPANY, Arlington, VA (US)

( * ) Notice: Subject to any disclaimer, the term of this patent is extended or adjusted under 35 U.S.C. 154(b) by 65 days.

(21) Appl. No.: 18/483,344

(22) Filed: Oct. 9, 2023

(65) Prior Publication Data

US 2025/0119178 A1    Apr. 10, 2025

(51) Int. Cl.
  *H04B 3/487*    (2015.01)

(52) U.S. Cl.
  CPC .................................. *H04B 3/487* (2015.01)

(58) Field of Classification Search
  CPC . H04B 3/02; H04B 3/46; H04B 3/487; H04B 3/493; H04B 3/32; H04B 3/34
  See application file for complete search history.

(56) References Cited

U.S. PATENT DOCUMENTS

| | | | | |
|---|---|---|---|---|
| 3,665,458 A * | 5/1972 | Mulkey | ............... | H03M 1/78 341/150 |
| 5,339,041 A * | 8/1994 | Nitardy | ............ | H03F 1/0222 375/268 |
| 5,404,113 A * | 4/1995 | Nitardy | ............ | H03F 1/0222 330/164 |
| 6,411,108 B1 * | 6/2002 | Douglas | ............... | H04M 1/24 324/754.28 |
| 6,611,148 B2 * | 8/2003 | Clinton | ............... | H04B 3/46 324/544 |
| 6,700,399 B1 * | 3/2004 | Savithri | ............ | H01L 22/34 438/18 |
| 7,067,842 B1 * | 6/2006 | Jayapalan | ............ | H01L 22/34 257/E21.524 |
| 7,337,419 B2 * | 2/2008 | Hossain | ......... | H01L 23/5222 716/115 |

(Continued)

OTHER PUBLICATIONS

Vendrame et al., "Crosstalk-Based Capacitance Measurements: Theory and Applications," IEEE Transactions on Semiconductor Manufacturing, vol. 19, No. 1, Feb. 2006, pp. 67-77.

(Continued)

*Primary Examiner* — James M Perez
(74) *Attorney, Agent, or Firm* — MH2 Technology Law Group LLP

(57) ABSTRACT

A system for measuring parasitic capacitance coupling between adjacent first communication transmission line and second communication transmission line is disclosed. The system including: a parasitic tolerant capacitive based coupling measurement circuit (CBCM), the CBCM including: a capacitive auto-zeroing buffer configured to bias the second communication transmission line and displace coupling charge transferred from the first communication transmission line to a switched capacitor storage element; a capacitive trans-impedance amplifier configured to integrate displaced coupling charge onto an output voltage node; and a comparator configured to switch states once the capacitive trans-impedance amplifier integration has surpassed a reference trippoint.

20 Claims, 10 Drawing Sheets

(56) References Cited

U.S. PATENT DOCUMENTS

| | | | | |
|---|---|---|---|---|
| 7,349,471 | B2* | 3/2008 | Cosand | H04L 25/4902 |
| | | | | 375/259 |
| 7,639,001 | B2* | 12/2009 | Harres | H04B 3/32 |
| | | | | 324/750.3 |
| 8,214,781 | B1* | 7/2012 | Liu | G06F 30/34 |
| | | | | 716/108 |
| 8,253,392 | B2* | 8/2012 | Thiesen | H02N 2/181 |
| | | | | 307/107 |
| 8,638,105 | B2* | 1/2014 | Martinelli | G01R 31/3648 |
| | | | | 340/870.07 |
| 9,300,356 | B2* | 3/2016 | Winward | H04B 3/02 |
| 9,503,155 | B2* | 11/2016 | Gabriel | G01R 31/31712 |
| 9,871,293 | B2* | 1/2018 | Patel | H01Q 13/28 |
| 10,063,077 | B2* | 8/2018 | Solodovnik | H02J 7/0042 |
| 10,771,108 | B1* | 9/2020 | Fazeel | H10D 84/811 |
| 10,892,911 | B2* | 1/2021 | Wojciechowski | H04L 7/0331 |
| 11,029,355 | B2* | 6/2021 | Yao | G11C 11/419 |
| 11,233,557 | B2* | 1/2022 | Lee | H04B 7/088 |
| 11,608,186 | B2* | 3/2023 | Solodovnik | H02M 1/123 |
| 12,068,802 | B1* | 8/2024 | Bluestone | H04B 3/487 |
| 2001/0033177 | A1* | 10/2001 | Lindolf | G01R 31/2853 |
| | | | | 324/679 |
| 2002/0039028 | A1* | 4/2002 | Douglas | H04B 5/73 |
| | | | | 324/658 |
| 2003/0020484 | A1* | 1/2003 | Clinton | H04B 3/46 |
| | | | | 324/544 |
| 2004/0019864 | A1* | 1/2004 | Kim | G06F 30/367 |
| | | | | 716/113 |
| 2004/0207412 | A1* | 10/2004 | Kunikiyo | G01R 27/2605 |
| | | | | 324/679 |
| 2005/0105606 | A1* | 5/2005 | Cosand | H04L 25/4902 |
| | | | | 375/239 |
| 2007/0165680 | A1* | 7/2007 | Harres | H04L 1/24 |
| | | | | 370/522 |
| 2010/0052658 | A1* | 3/2010 | Harres | H04L 1/24 |
| | | | | 324/750.3 |
| 2011/0069782 | A1* | 3/2011 | Wilson | H04B 3/32 |
| | | | | 375/295 |
| 2013/0240884 | A1* | 9/2013 | Barth | H01L 23/544 |
| | | | | 257/532 |
| 2014/0372057 | A1* | 12/2014 | Van der Plas | G01B 7/003 |
| | | | | 702/65 |
| 2015/0091603 | A1* | 4/2015 | Tomita | G01R 31/2884 |
| | | | | 324/762.01 |
| 2015/0155912 | A1* | 6/2015 | Winward | A61B 5/7225 |
| | | | | 375/257 |
| 2015/0229293 | A1* | 8/2015 | Nagahisa | H03H 11/1204 |
| | | | | 327/559 |
| 2017/0279287 | A1* | 9/2017 | Solodovnik | B60L 58/20 |
| 2019/0049498 | A1* | 2/2019 | Mori | G01R 27/02 |
| 2019/0138782 | A1* | 5/2019 | Zhang | G06F 3/044 |
| 2024/0106401 | A1* | 3/2024 | Nicollini | H03F 1/26 |
| 2025/0119178 | A1* | 4/2025 | Bluestone | H04B 3/487 |
| 2025/0138071 | A1* | 5/2025 | Bluestone | H04B 3/46 |

OTHER PUBLICATIONS

Xu et al., "On-Chip Test Circuit for Measuring Substrate and Line-to-Line Coupling Noise," IEEE Journal of Solid-State Circuits, vol. 41, No. 2, Feb. 2006, pp. 474-482.

Chang Y. W. et al., "A novel CBCM method free from charge injection induced errors: investigation into the impact of floating dummy-fills on interconnect capacitance", Microelectronic Test Structures, 2005. ICMTS 2005. Proceedings of the 2005 International Conference on Leuven, Belgium Apr. 4-7, 2005, Piscataway, NJ, USA, IEEE, US, Apr. 4, 2005, pp. 235-238.

Sylvester D. et al., "Investigation of Interconnect Capacitance Characterization Using Charge-Based Capacitance Measurement (CBCM) Technique and Three-Dimensional Simulation," IEEE Journal of Solid-State Circuits, IEEE, USA, vol. 33, No. 3, Mar. 1, 1998, pp. 449-453.

Extended European Search Report issued in corresponding European Patent Application No. 24182621.3, dated Dec. 20, 2024, 8 pages.

Bluestone, A.J., et al., "Methods and Apparatus for In-Situ Measurement of Mutual Inductance Between Embedded Interconnects," U.S. Appl. No. 18/498,899, filed Oct. 31, 2023, 36 pages.

Extended European Search Report for European Application No. 24196283.6 dated Feb. 17, 2025, 8 pages.

Kaushik et al., "An analytical approach to dynamic crosstalk in coupled interconnects," Microelectronics Journal, vol. 41, 2010 (Available online Feb. 6, 2010), pp. 85-92.

Ogashara et al., "Measurement and Analysis of Inductive Coupling Noise in 90 nm Global Interconnects," IEEE Journal of Solid-State Circuits, vol. 43, No. 3, Mar. 2008, pp. 718-728.

Sinha et al., "Validation and Test Issues Related to Noise Induced by Parasitic Inductances of VLSI Interconnects," IEEE Transactions on Advanced Packaging, vol. 25, No. 3, Aug. 2002, pp. 329-339.

Yu et al., "Staggered Twisted-Bundle Interconnect for Crosstalk and Delay Reduction," Proceedings of the Sixth International Symposium on Quality Electronic Design (ISQED'05), Mar. 21-23, 2005, 6 pages.

* cited by examiner

Simulation Results

Simulated measurement ($C_{meas}$) for a logarithmic sweep of coupling capacitances ($C_{DUT}$)

Derivative of simulated results shows 99.95% linearity over 5 orders of magnitude

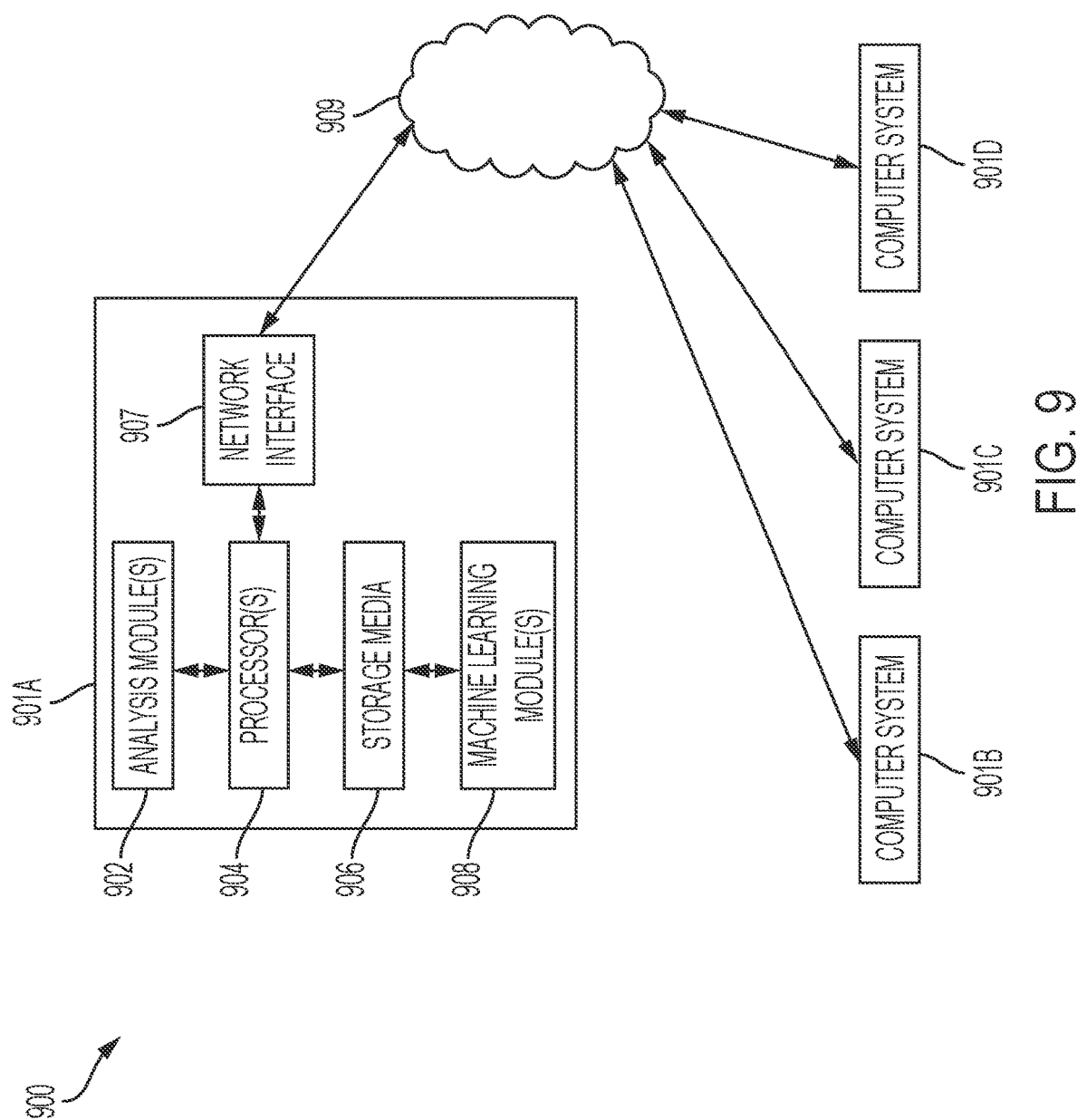

PARASITIC TOLERANT CHARGE-BASED COUPLING MEASUREMENT

FIELD

This application is directed to systems and method for parasitic tolerant charge-based coupling measurements.

BACKGROUND

Mutual coupling/cross talk measurements are usually done with expensive test equipment that requires disconnecting signal wires from a system transmitter and receiver and connecting them to test equipment instead, and then reconnecting them back into the system. This approach tends to have many disadvantages including being both inefficient and time consuming.

A major source of crosstalk in high-speed data links comes from the coupling capacitance between parallel interconnect elements. The charge-based capacitance measurement (CBCM) provides a method to precisely characterize the coupling capacitance, and consequently estimate high frequency isolation performance. Conventional CBCM architectures are sensitive to parasitic coupling to ground/power supplies, ultimately limiting measurement resolution for long interconnects with substantial ground shielding.

Accordingly, an improved approach to measure capacitive-coupling between various nodes/wires/interconnect is needed.

SUMMARY

According to examples of the present disclosure, a system for measuring parasitic capacitance coupling between adjacent first communication transmission line and second communication transmission line is disclosed. The system comprises a parasitic tolerant capacitive based coupling measurement circuit (CBCM), the CBCM comprising: a capacitive buffer configured to bias the second communication transmission line and displace coupling charge transferred from the first communication transmission line to a switched capacitor storage element; a capacitive trans-impedance amplifier configured to integrate displaced coupling charge onto an output voltage node; and a comparator configured to switch states once the capacitive trans-impedance amplifier integration has surpassed a reference trippoint.

According to examples of the present disclosure, the system can include one or more of the following features. The system can further comprises a digital signal generator that provides a digital periodic signal to a receive end of the first communication transmission line. The digital periodic signal in the first communication transmission line induces a charge to flow in the second communication transmission line. The second communication transmission line maintains a constant bias and no charge from parasitic capacitances is transferred to the capacitive trans-impedance amplifier. The first communication transmission line is an aggressor line. The second communication transmission line is a victim line. The first communication transmission line and the second communication transmission line are high-speed analog communications channels. The first communication transmission line and the second communication transmission line are digital communications channels. The digital communications channels comprise ASICs or FPGAs. The system can further comprise a processor configured to receive an output from the voltage comparator and determine the capacitive-based coupling measurement. The voltage comparator is a dynamic, clocked voltage comparator.

According to example of the present disclosure, a method to determine a coupling capacitance between a first communication line and a second communication line is disclosed. The method comprises providing a periodic digital signal to a first communication transmission line that induces a charge to flow in a nearby second communication transmission line, wherein the charge flows through a capacitive auto-zeroing buffer; integrating the charge onto a feedback capacitor of a capacitive trans-impedance amplifier when the charge is positive due to a positive change in voltage of the periodic digital signal on the first communication transmission line; disconnecting the capacitive trans-impedance amplifier from a signal path prior to a negative charge flow due to a negative change in voltage in the signal in the first communication transmission line; integrating in one direction until integrated charge formulates a voltage which crosses a known threshold as measured on a voltage comparator circuit; and counting a number of cycles required to cross the known threshold to infer a coupling capacitance between the first communication transmission line and the second communication transmission line.

According to examples of the present disclosure, the method can include one or more of the following features. Prior to the providing the periodic digital signal, the method comprises resetting a capacitive buffer capacitor of a capacitive auto-zeroing buffer by closing and reopening a switch in parallel with the capacitive buffer capacitor at a first time and resetting the feedback capacitor of the capacitive trans-impedance amplifier by closing and reopening a switch in parallel with the feedback capacitor at a second time. The second communication transmission line maintains a constant bias and no charge from parasitic capacitances is transferred to the capacitive trans-impedance amplifier. The first communication transmission line is an aggressor line. The second communication transmission line is a victim line. The first communication transmission line and the second communication transmission line are high-speed analog communications channels. The first communication transmission line and the second communication transmission line are digital communications channels. The digital communications channels comprise ASICs or FPGAs. The method further comprises receiving, at a processor, an output from the voltage comparator circuit and determining a capacitive-based coupling.

BRIEF DESCRIPTION OF THE FIGURES

The accompanying drawings, which are incorporated in and constitute a part of this specification, illustrate embodiments of the present teachings and together with the description, serve to explain the principles of the disclosure.

FIG. 9 shows a computing system according to examples of the present disclosure.

DETAILED DESCRIPTION

Figure 1:
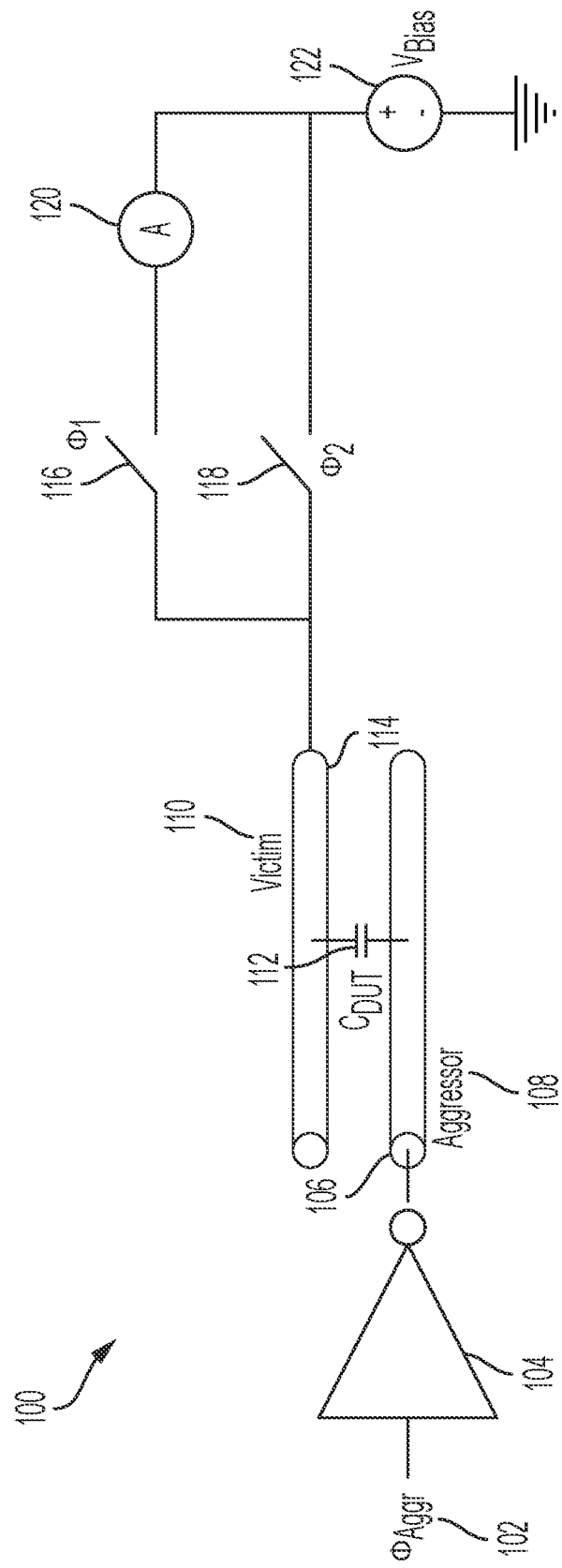
FIG. 1 shows a simplified conventional overview.

Reference will now be made in detail to the present embodiments, examples of which are illustrated in the accompanying drawings. Wherever possible, the same reference numbers will be used throughout the drawings to refer to the same or like parts.

Generally speaking, examples according to the present disclose provides for a system or device, such as an integrated circuit (IC), that is configured to measure capacitive coupling between various nodes/wires/interconnect. Additionally, examples according to the present disclose provides for a method for measuring capacitive coupling between various nodes/wires/interconnect using a system or device, such as an IC. Conventional charge-based capacitance measurement (CBCM) architectures are sensitive to parasitic coupling to ground/power supplies, ultimately limiting measurement resolution for long interconnects with substantial ground shielding. In some examples, the present capacitive buffer circuit, combined with auto-zero sequencing, mitigates the aforementioned non-ideality and maintains coupling measurement resolution with parasitic capacitance >100,000× larger than coupling capacitance under test. Examples of the present disclosure allows on-chip capacitive coupling measurements with resolution better than 10 attofarads on circuit nodes with parasitic capacitances greater than 1 nanofarad and allows characterization of long interconnect (e.g. PCB traces) with capacitive coupling to nearby traces while providing the ability to maintain measurement resolution/accuracy while larger parasitic capacitance are present.

A major source of crosstalk in high-speed data links comes from the coupling capacitance between parallel interconnect elements. Examples of the present disclosure provides for a CBCM that provides a method to precisely characterize the coupling capacitance, and consequently estimate high frequency isolation performance. Examples of the present disclosure exploits the principle $\Delta Q = C \Delta V$ by applying a voltage step on an Aggressor line, and measuring the corresponding change of charge on a Victim line—as required to maintain a constant voltage Vbias. The measurement resolution on $C_{DUT}$ is significantly improved by repeating the voltage step numerous times and integrating the charge in one direction through a capacitive trans-impedance amplifier (CTIA). A comparator is used to count how many steps are required to integrate above a known trippoint.

Since this measurement is near-DC (no high-frequency content/high-throughput processing), many baseband techniques can be utilized to isolate non-idealities and enhance measurement performance: Digital Correlated Double Sampling, calibration of charge injection, and ramp-up/ramp-down averaging.

In addition to the coupling capacitance, $C_{DUT}$, the interconnect elements may exhibit a large parasitic capacitance to the ground plane, $C_{Para}$, often many orders of magnitude greater than the coupling capacitance (nanofarads vs. hundreds of attofarads). This is uncommon to typical CBCM implementations and preliminary simulations showed this would corrupt the resolution of the measurement. As the victim line is switched between two versions of $V_{bias}$, the parasitic capacitance must charge and discharge small amounts for non-ideal mismatches between the signal paths. For long interconnect DUTs, this delta charge can be orders of magnitude larger than the signal of interest. The capacitive buffer shown in FIG. 4 overcomes the sensitivity to ground plane parasitics. The victim line containing the large parasitic is held a constant voltage, removing the undesired charge and discharge. Furthermore, auto-zeroing operation reduces amplifier non-idealities including systematic voltage offset and flicker noise.

FIG. 1 shows a simplified conventional overview 100. As shown in FIG. 1, an aggressor signal 102, denoted by $\phi_{aggr}$, is provided to receive end 106 of aggressor line 108. An example aggressor signal 102 is shown in in FIG. 5 in 508. Aggressor line 108 is near victim line 110 in a parallel arrangement. Coupling capacitance 112, denoted by $C_{DUT}$, between aggressor line 108 and victim line 110 is measured by using a switched parallel current measurement architecture at transmit end 114 of victim line 110 that includes switch 1 116, closed in $\phi_1$, switch 2 118, closed in $\phi_2$, and amp meter 120, and voltage bias, denoted by $V_{bias}$ 122.

Figure 2:
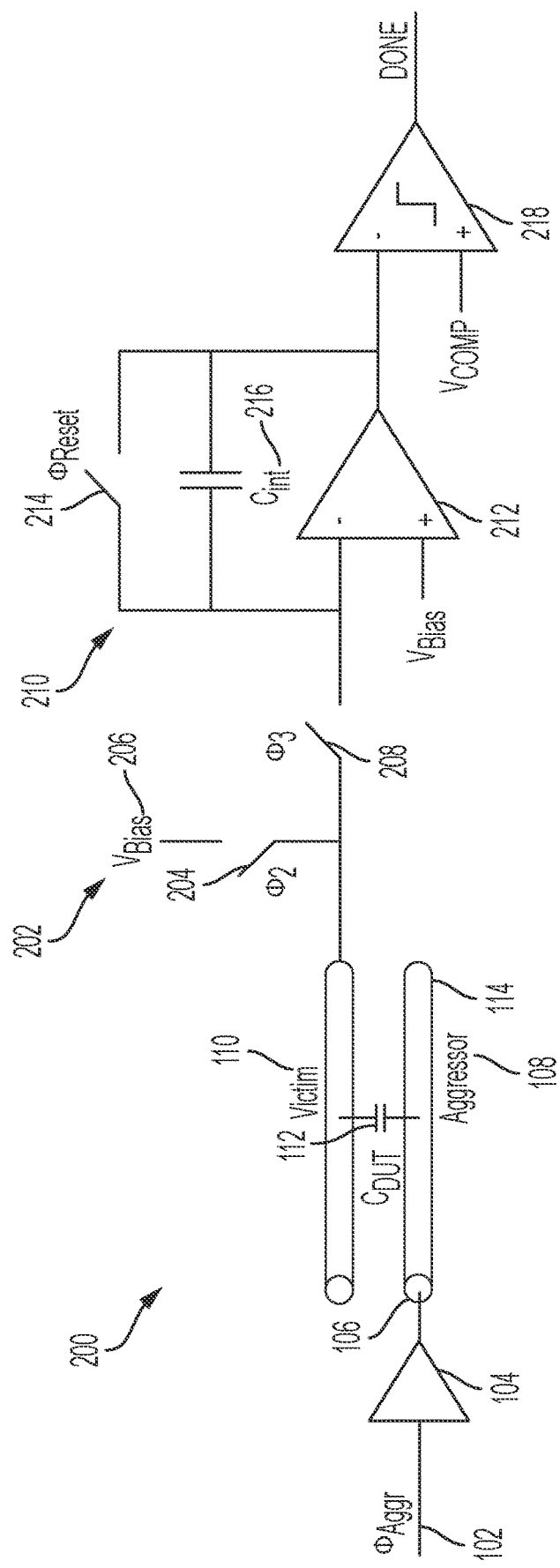
FIG. 2 shows another simplified conventional overview configuration.

FIG. 2 shows another simplified conventional overview configuration 200. As shown in FIG. 2, an aggressor signal 102, denoted by $\phi_{aggr}$, is amplified by amplifier 104 and provided to receive end 106 of aggressor line 108. Aggressor line 108 is near victim line 110 in a parallel arrangement. Coupling capacitance 112, denoted by $C_{DUT}$, between aggressor line 108 and victim line 110 is measured by using switched parallel current measurement architecture 202 at transit end of victim line 110. Switched parallel current measurement architecture 202 includes switch 1 204, closed in $\phi_2$, which when closed provides voltage bias 206, denoted $V_{bias}$, and switch 2 208, closed in $\phi_3$, which when closed provide the signal from victim line 110 to switched capacitance amplifier 210 that includes amplifier 212, switch 214, closed in $\phi_{Reset}$, and capacitor 216, denoted by $C_{int}$. The output of switched capacitance amplifier 212 is provided to integrator and comparator 218.

On-chip analog-to-digital conversion and calibration are used to eliminate off-chip noise and to extend the measurement accuracy by removing system noise. The test circuit uses switched-capacitor circuits with digital outputs. Coupling noise is sensed by the receiver and passed to the input of the integrator where the sensed noise voltage is amplified and integrated. The integrated coupling noise is converted to a digital signal by an on-chip ADC consisting of a 1-bit differential comparator and a 10-bit counter. The integrated coupling noise is applied to the inputs of the comparator and compared to the reference voltages at each clock cycle as shown in FIG. 3 and FIG. 4.

There is noise, however, caused by clock feedthrough from the switches, OPAMP offset, mismatch of the two differential paths, and other forms of random noise. Other noise sources such as noise, thermal noise, and kT/C noise may also exist in the integrator output analog voltage signal. In order to achieve accurate results, these noise sources must be removed from the integrator output. An on-chip calibration process is used in this test circuit to remove the integrator offset voltage and other noise voltages.

The system noise in the measured data is removed by an on-chip calibration process. During the calibration process, the noise generators are maintained inactive such that only the system noise is integrated and compared to the reference voltages. A digital code is generated at the end of the calibration process and used to calibrate the raw test data. Each measurement generates two 10-bit digital codes, the raw data code and the calibration code. The peak-to-peak substrate noise voltage is determined from the integrator gain, reference voltages, and the decimal value of the two digital codes.

Figure 3:
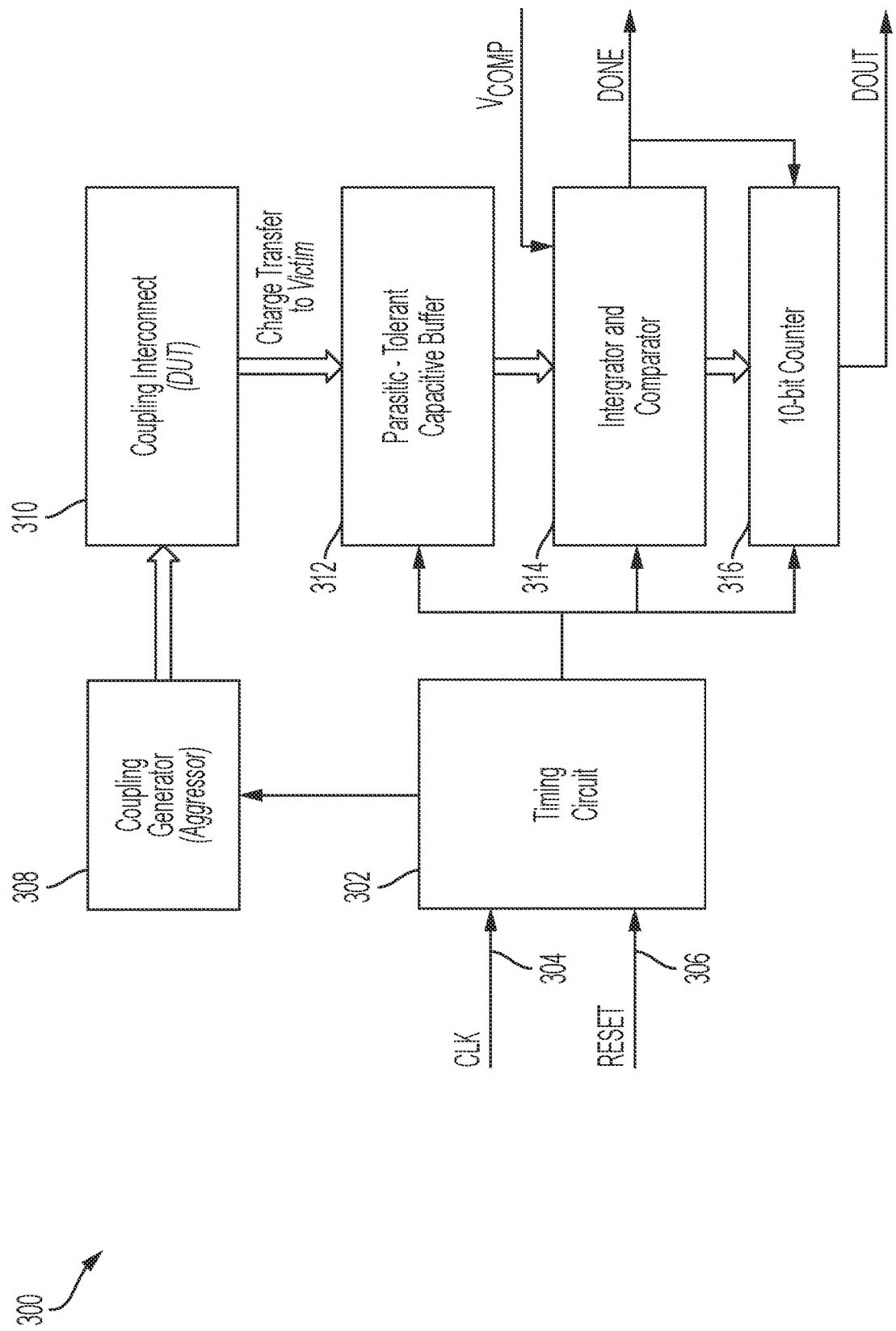
FIG. 3 shows a block diagram circuit configuration according to examples of the present disclosure.
Figure 4:
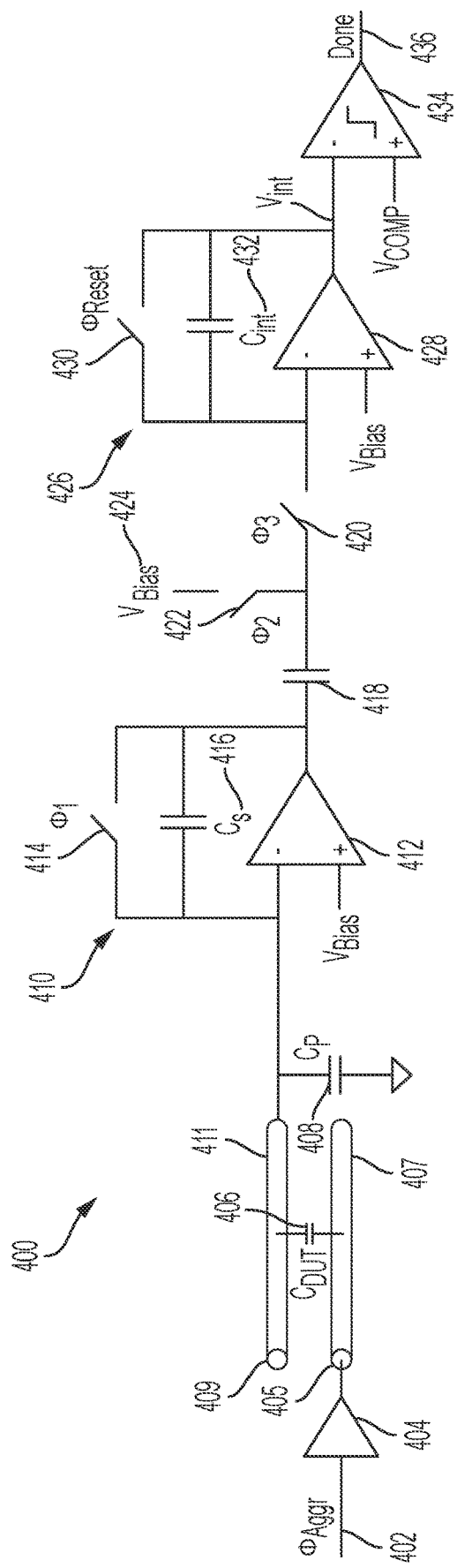
FIG. 4 shows an example of FIG. 3 including a parasitic tolerant CBCM with auto-zeroing capacitive buffer according to examples of the present disclosure.

FIG. 3 shows a block diagram circuit configuration 300 according to examples of the present disclosure. As shown in FIG. 3, the circuit comprises timing circuit 302 that has two inputs, namely clock signal input 304 and reset input 306, both shown in FIG. 5. Output from timing circuit 302 is provided to coupling generator (aggressor) 308 (amplifier 404 of FIG. 4). Output from coupling generator (aggressor) 308 is provided to coupling interconnect (DUI) 310 (coupled first communication transmission line 407 and second communication transmission line 409 of FIG. 4). Output from coupling interconnect (DUI) 310, which represents the charge transfer to the victim line, is provided to parasitic tolerant capacitive buffer 312 (also shown in 410 of FIG. 4). Output signal from parasitic tolerant capacitive buffer 312, denoted by $V_{COMP}$, is provided to integrator and comparator 314 (also shown in 426 and 434 of FIG. 4). Output from integrator and comparator 314 (also shown in 436 of FIG. 4 that goes to 316 of FIG. 3) is provided to 10-bit counter 316. Output from 10-bit counter 316 is $D_{out}$. Output from timing circuit 302 is also provided to parasitic tolerant capacitive buffer 312, integrator and comparator 314, and 10-bit counter 316.

FIG. 4 shows an example configuration of FIG. 3 that includes a parasitic tolerant CBCM with auto-zeroing capacitive buffer 400 according to examples of the present disclosure. As shown in FIG. 4, an aggressor signal 402, denoted by $\phi_{aggr}$, is a periodic digital signal that is amplified by amplifier 404 and provided to receive end 405 of first communication transmission line 407 (e.g., aggressor line, such as aggressor line 108). For example, aggressor signal 402 is shown FIG. 5 at 508. First communication transmission line 407 is near second communication transmission line 409 (e.g., victim line, such as victim line 110) in a parallel arrangement. In some examples, first communication transmission line 407 (e.g., aggressor line, such as aggressor line 108) and second communication transmission line 409 (e.g., victim line) are separated by a distance that ranges from the scale of microns to the scale of millimeters. In some examples, the digital communications channels comprise application-specific integrated circuits (ASICs) or field programmable gate arrays (FPGAs).

Coupling capacitance 406, denoted by $C_{DUT}$, between first communication transmission line 407 (e.g., such as aggressor line 108 and second communication transmission line 409 (e.g., such as victim line 110) is measured by using a capacitive trans-impedance amplifier architecture at transmit end 411 of second communication transmission line 409 that includes parasitic capacitor 408, denoted by $C_{para}$, first switched capacitance amplifier, e.g., parasitic-tolerant capacitive auto-zeroing buffer 410, that comprises amplifier 412, switch 414, closed in $\phi_1$, and capacitor 416, denoted by $C_s$. The output of parasitic-tolerant capacitive auto-zeroing buffer 410 is provided to capacitor 418 and switch 420, closed according to timing signal 504, $\phi_2$, and switch 422, closed according to timing signal 506, $\phi_3$, When switch 420 is closed, voltage bias 424, denoted by $V_{bias}$, is provided to the system. When switch 422 is closed, the signal output from capacitor 418 is provided to second switched capacitance amplifier, e.g., capacitive trans-impedance amplifier 426 that comprises amplifier 428, switch 430 activated by reset signal closed in $\phi_{Reset}$, and capacitor, e.g., feedback capacitor 432, denoted by $C_{int}$. The output of capacitive trans-impedance amplifier 426 is provided to integrator and comparator, e.g., voltage comparator circuit 434.

In operation, parasitic-tolerant capacitive auto-zeroing buffer 410 is configured to bias second communication transmission line 409 (e.g., victim line) and displace a coupling charge transferred as a result of coupling from first communication transmission line 407 (e.g., aggressor line) to second communication transmission line 409 (e.g., victim line) to a switched capacitor storage element, such as capacitor 416, denoted by $C_s$. Capacitive trans-impedance amplifier (CTIA) 426 is configured to integrate displaced coupling charge onto an output voltage node, denoted $V_{int}$. Voltage comparator circuit 434, such as a dynamic, clocked voltage comparator, is configured to switch states once the CTIA integration has surpassed a reference trippoint, denoted $V_{COMP}$. Second communication transmission line 409 (i.e., victim line) maintains a constant bias and no charge from parasitic capacitance $C_{para}$ 408 is transferred to the CTIA.

Figure 5:
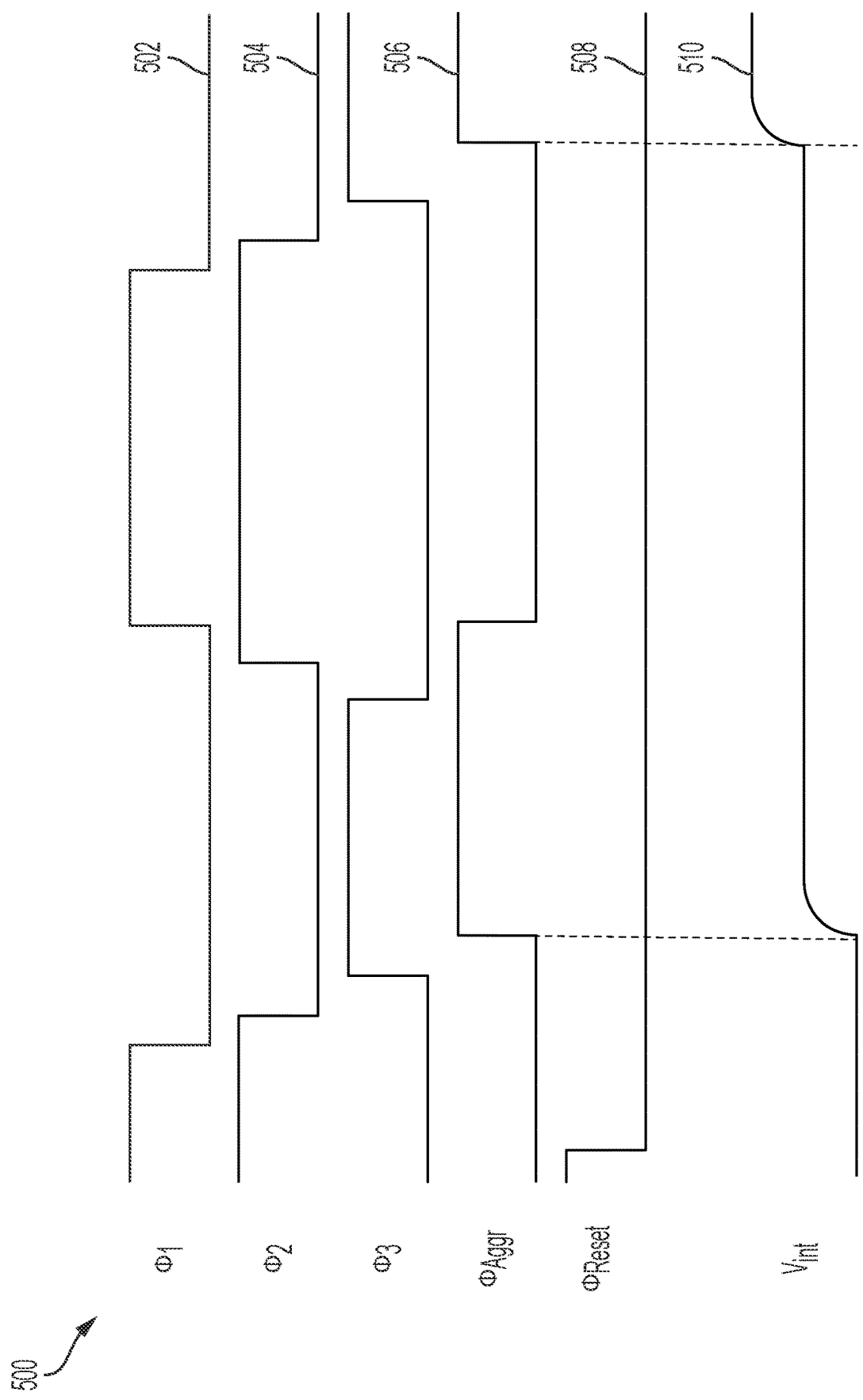
FIG. 5 shows a timing diagram for the configuration of FIG. 4.

FIG. 5 shows a timing diagram 500 for FIG. 3 and FIG. 4. Timing diagram 500 shows timing signal, $\phi_1$, 502 for switch 414, timing signal, $\phi_2$, 504 for switch 420, timing signal 506, in $\phi_3$, for switch 422, timing signal 508 for aggressor signal 402, denoted by $\phi_{aggr}$, timing signal 510 for reset signal denoted by $\phi_{Reset}$ for switch 430, and timing signal 512 for $V_{int}$. The high signal values represent a signal that closes the respective switch and the low signals values represent a signal that opens the respective switch.

Figure 6A:
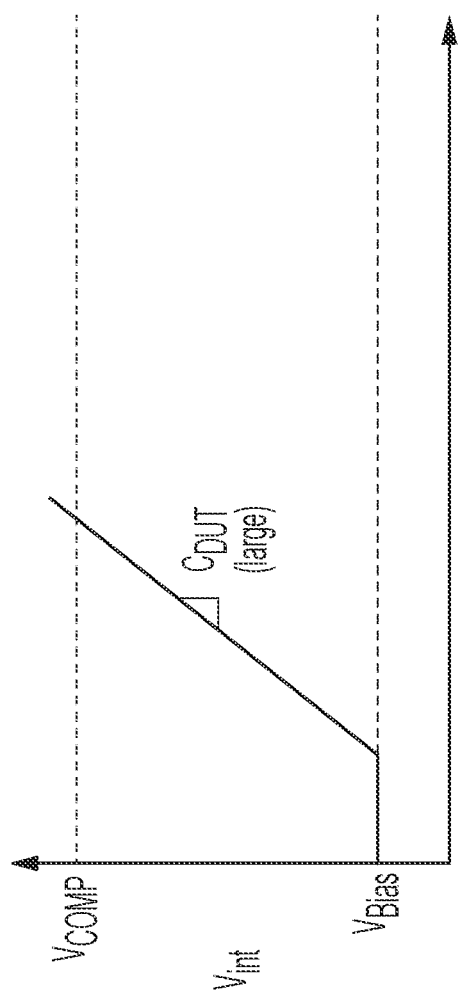
FIG. 6A and FIG. 6B show a zoomed-out view of the timing diagram of FIG. 5.
Figure 6B:
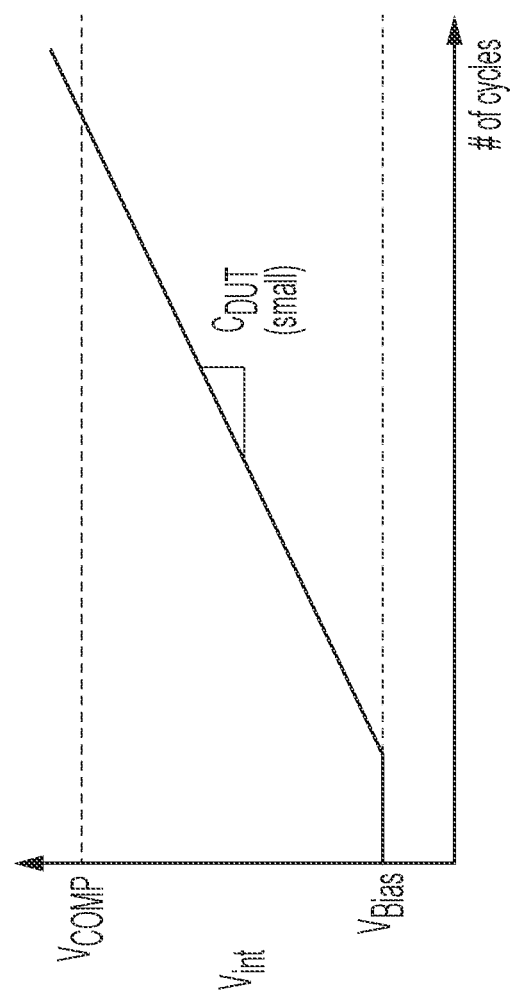

FIG. 6A and FIG. 6B show a zoomed-out view of the timing diagram of FIG. 5, and in particular plots of $V_{int}$ versus number of cycles. As shown in FIG. 6A and FIG. 6B, the voltage, as denoted $C_{DUT}$, is shown plotted against $V_{int}$ versus the number of cycles and when the $V_{int}$ reaches the known threshold, as denoted $V_{COMP}$, capacitive trans-impedance amplifier 426 outputs a signal to voltage comparator circuit 434.

Figure 7A:
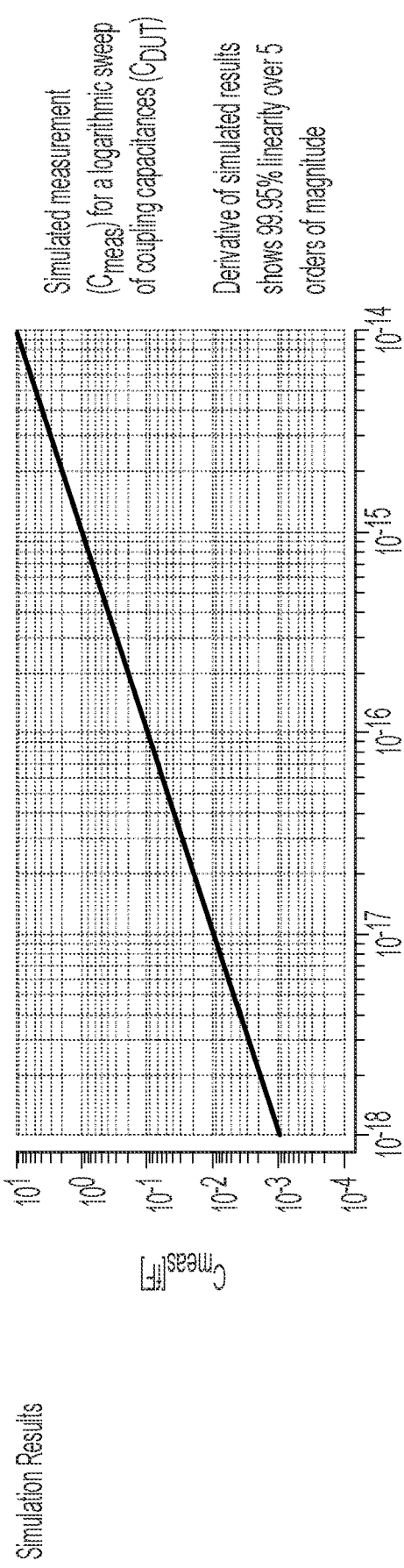
FIG. 7A and FIG. 7B show simulation results for the configuration of FIG. 4.
Figure 7B:
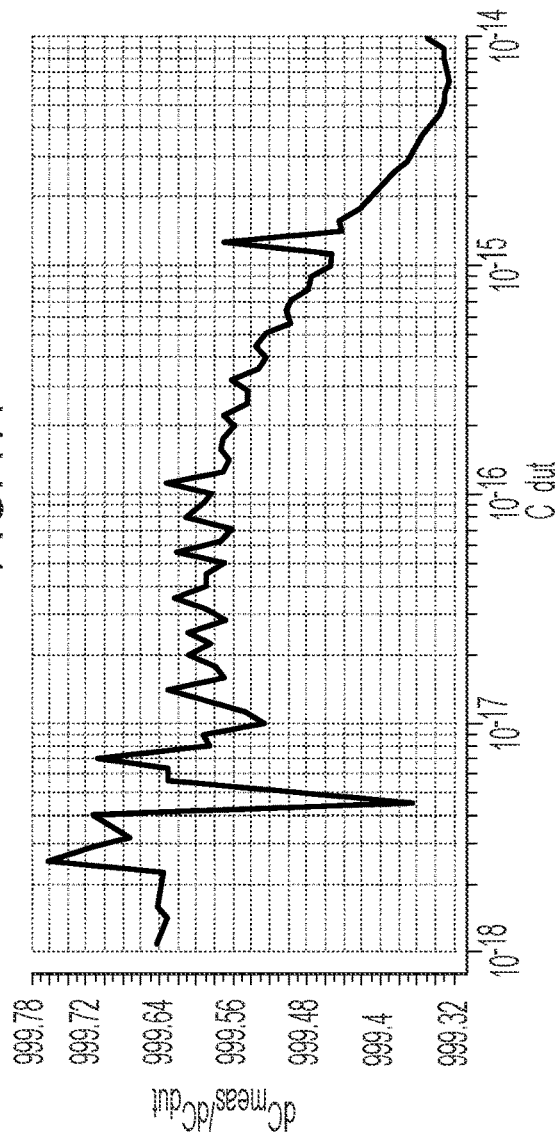

FIG. 7A and FIG. 7B show simulation results for the configuration of FIG. 4. In particular, FIG. 7A shows a plot of $C_{meas}[fF]$ versus $C_{dut}$ that illustrates simulated measurement ($C_{meas}$) for a logarithmic sweep of coupling capacitance ($C_{DUT}$) and FIG. 7B shows a plot of $$\frac{dC_{meas}}{dC_{DUT}}$$

versus $C_{DUT}$ that illustrates derivate of simulation results that shows 99.95% linearity over 5 orders of magnitude. The simulation results are based on transient simulations with foundry-provided transistor models and emulated wiring interconnect in Cadence Virtuoso that validate the improved performance with 10 aF resolution and 1 nF parasitic capacitance.

Figure 8:
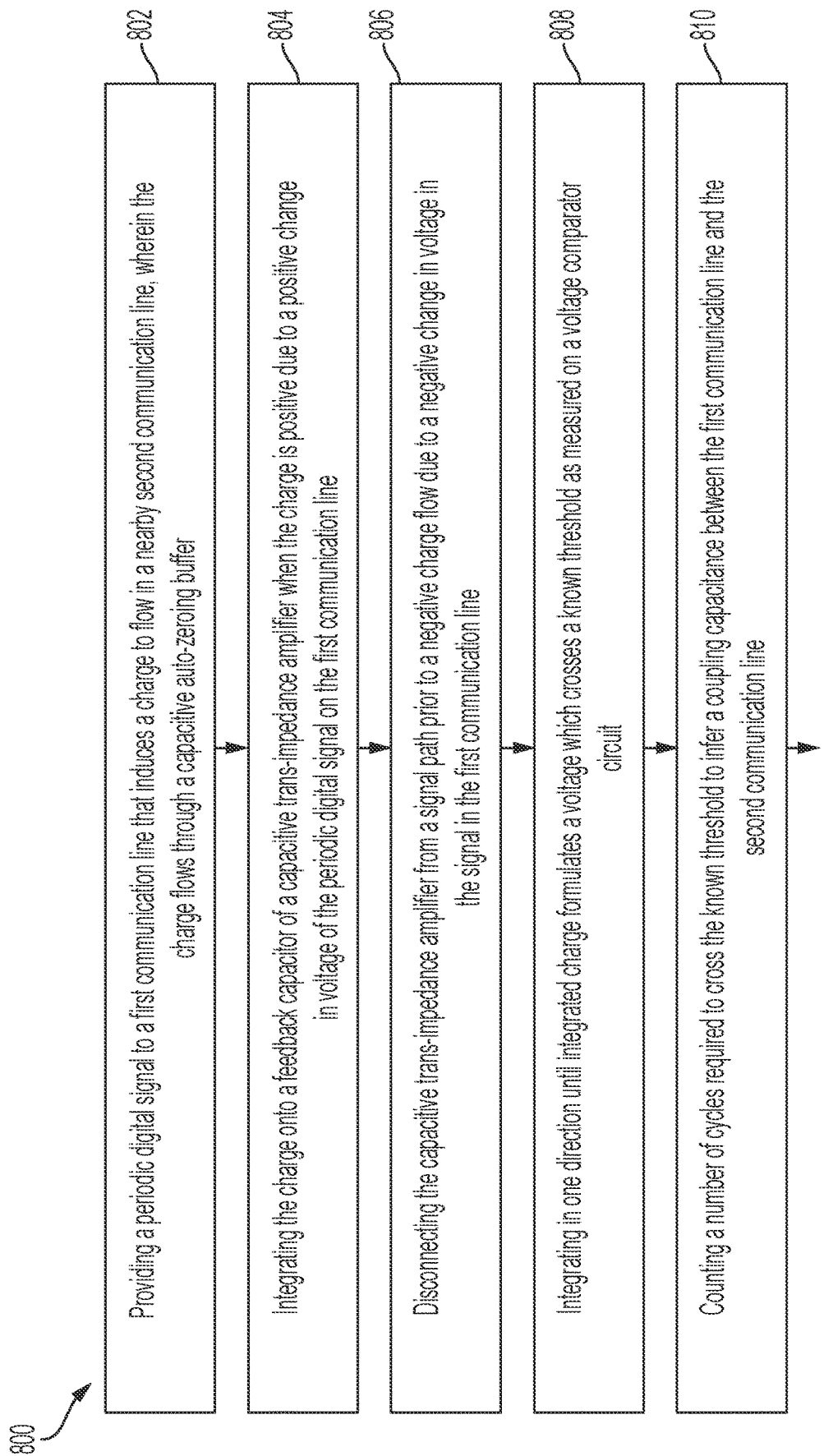
FIG. 8 show a flowchart for a method according to examples of the present disclosure.
Figure 8:
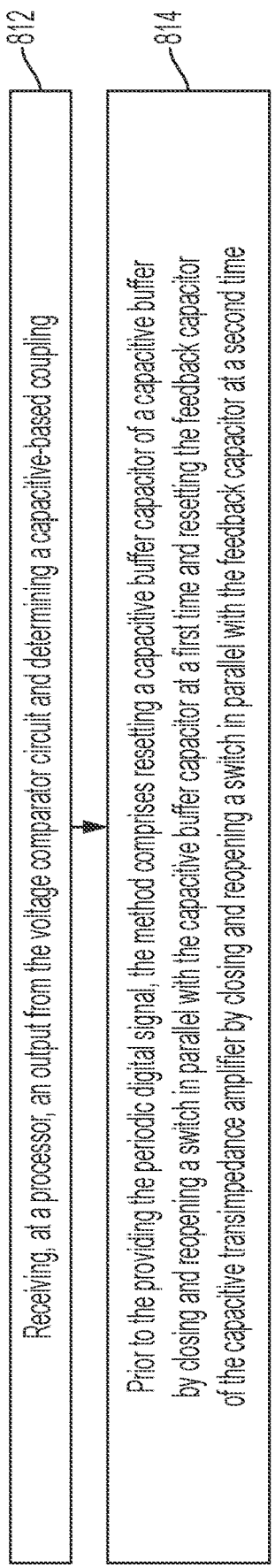

FIG. 8 shows a method 800 for measuring capacitive-coupling between adjacent communication transmission lines according to examples of the present disclosure. Method 800 comprises providing a periodic digital signal to a first communication line that induces a charge to flow in a nearby second communication line, wherein the charge flows through a capacitive auto-zeroing buffer, as in 802. Referring to FIG. 4, aggressor signal 402, denoted by $\phi_{aggr}$, is provided to receive end 405 of first communication transmission line 407 (e.g., such as aggressor line 108) where first communication transmission line 407 is near second communication transmission line 409 (e.g., such as victim line 110) in a parallel arrangement with coupling capacitance 406, denoted by $C_{DUT}$, between first communication transmission line 407 and second communication transmission line 409.

Method 800 continues by integrating the charge onto a feedback capacitor of a capacitive trans-impedance amplifier when the charge is positive due to a positive change in voltage of the periodic digital signal on the first communication line, as in 804. Returning to FIG. 4, feedback capacitor 432, denoted by $C_{int}$, (the feedback capacitor) of capacitive trans-impedance amplifier 426 integrates the charge induced on second communication transmission line 409 (e.g., victim line) by first communication transmission line 407 (e.g., aggressor line).

Method 800 continues by disconnecting the capacitive trans-impedance amplifier from a signal path prior to a negative charge flow due to a negative change in voltage in the signal in the first communication line, as in 806. Returning to FIG. 4, capacitive trans-impedance amplifier 426 is disconnected from the signal path by first closing switch 422 and then opening switch 420 when aggressor signal 402 induces a negative charge flow in second communication transmission line 409.

Method 800 continues by integrating in one direction (only positive charge so that voltage only flows in one direction) until integrated charge formulates a voltage which crosses a known threshold as measured on a voltage comparator circuit, as in 808. Returning to FIG. 4, capacitive trans-impedance amplifier 426 is reconnected from the signal path by first opening switch 422 and then closing switch 420 when aggressor signal 402 again induces a positive charge flow in second communication transmission line 409. Also as shown in FIG. 6A and FIG. 6B, the voltage, as denoted $C_{DUT}$, is shown plotted against $V_{int}$ versus the number of cycles and when the $V_{int}$ reaches the known threshold, as denoted $V_{COMP}$, the capacitive trans-impedance amplifier 426 outputs a signal to voltage comparator circuit 434.

Method 800 continues by counting a number of cycles required to cross the known threshold to infer a coupling capacitance between the first and the second communications lines, as in 810. Returning to FIG. 4, voltage comparator circuit 434 then counts the number of cycles required to cross the known threshold, as denoted $V_{COMP}$ in FIG. 6A and FIG. 6B, and then outputs a signal representative of completion of the process.

Method 800 can continue by receiving, at a processor, an output from the voltage comparator circuit and determining a capacitive-based coupling, as in 812. Returning to FIG. 3, the number of cycles counted prior to crossing the known threshold by 10-bit counter 316 is used to determine a capacitive-based coupling.

Method 800 can continue by prior to the providing the periodic digital signal, the method comprises resetting a capacitive buffer capacitor of capacitive auto-zeroing buffer by closing and reopening a switch in parallel with the capacitive buffer capacitor at a first time and resetting the feedback capacitor of the capacitive trans-impedance amplifier by closing and reopening a switch in parallel with the feedback capacitor at a second time, as in 814. Returning to FIG. 4, capacitive trans-impedance amplifier is reset by first opening switch 420 and then opening switch 430.

In some embodiments, any of the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis module(s) 902 configured to perform various tasks according to some embodiments, such as one or more methods disclosed herein. To perform these various tasks, the analysis module 902 executes independently, or in coordination with, one or more hardware processors 904, which is (or are) connected to one or more non-transitory computer readable medium 906, such as a computer storage media. The hardware processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents). A processor can include a microprocessor, microcontroller, processor module or subsystem, programmable integrated circuit, programmable gate array, or another control or computing device.

The non-transitory computer readable medium 906 can be implemented as one or more computer-readable or machine-readable storage media. The non-transitory computer readable medium 906 can be connected to or coupled with a machine learning module(s) 908. Note that while in the example embodiment of FIG. 9 non-transitory computer readable medium 906 is depicted as within computer system 901A, in some embodiments, non-transitory computer readable medium 906 may be distributed within and/or across multiple internal and/or external enclosures of computing system 901A and/or additional computing systems. The non-transitory computer readable medium 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

It should be appreciated that computer system 900 (or computing system) is only one example of a computing system, and that computer system 900 may have more or fewer components than shown, may combine additional components not depicted in the example embodiment of FIG. 9, and/or computer system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in an information processing apparatus such as general-purpose processors or application specific chips, such as ASICs, FPGAs, PLDs, or other appropriate devices. These modules, combinations of these modules, and/or their combination with general hardware are all included within the scope of protection of the invention.

Models and/or other interpretation aids may be refined in an iterative fashion; this concept is applicable to embodiments of the present methods discussed herein. This can include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the signal(s) under consideration.

The above-disclosed examples of the present disclosure can include one or more of the following clauses.

Clause 1. A system for measuring parasitic capacitance coupling between a first communication transmission line (407) and a second communication transmission line (409) that are adjacent, the system comprising:
  a parasitic tolerant capacitive based coupling measurement circuit (CBCM) (400), the CBCM comprising:
    a capacitive auto-zeroing buffer (410) configured to bias the second communication transmission line (409) and displace coupling charge transferred from the first communication transmission line to a switched capacitor storage element;
    a capacitive trans-impedance amplifier (426) configured to integrate displaced coupling charge onto an output voltage node; and
    a comparator (434) configured to switch states once the capacitive trans-impedance amplifier integration has surpassed a reference trippoint.

Clause 2. The system of clause 1, further comprising a digital signal generator (308) that provides a digital periodic signal to a receive end (405) of the first communication transmission line.

Clause 3. The system of clause 1 or clause 2, wherein the digital periodic signal in the first communication transmission line induces a charge to flow in the second communication transmission line.

Clause 4. The system of any of clauses 1-3, wherein the second communication transmission line maintains a constant bias and no charge from parasitic capacitances is transferred to the capacitive trans-impedance amplifier.

Clause 5. The system of any of clauses 1-4, wherein the first communication transmission line is an aggressor line.

Clause 6. The system of any of clauses 1-5, wherein the second communication transmission line is a victim line.

Clause 7. The system of any of clauses 1-6, wherein the first communication transmission line and the second communication transmission line are high-speed analog communications channels.

Clause 8. The system of any of clauses 1-7, wherein the first communication transmission line and the second communication transmission line are digital communications channels.

Clause 9. The system of any of clauses 1-8, wherein the digital communications channels comprise ASICs or FPGAs.

Clause 10. The system of any of clauses 1-9, further comprising a processor configured to receive an output from the voltage comparator and determine the capacitive-based coupling measurement.

Clause 11. The system of any of clauses 1-10, wherein the voltage comparator is a dynamic, clocked voltage comparator.

Clause 12. A method to determine a coupling capacitance between a first communication line and a second communication line, the method comprising:
  providing a periodic digital signal to a first communication transmission line that induces a charge to flow in a nearby second communication transmission line, wherein the charge flows through a capacitive auto-zeroing buffer;
  integrating the charge onto a feedback capacitor of a capacitive trans-impedance amplifier when the charge is positive due to a positive change in voltage of the periodic digital signal on the first communication transmission line;
  disconnecting the capacitive trans-impedance amplifier from a signal path prior to a negative charge flow due to a negative change in voltage in the signal in the first communication transmission line;
  integrating in one direction until integrated charge formulates a voltage which crosses a known threshold as measured on a voltage comparator circuit; and
  counting a number of cycles required to cross the known threshold to infer a coupling capacitance between the first communication transmission line and the second communication transmission line.

Clause 13. The method of clause 12, wherein prior to the providing the periodic digital signal, the method comprises resetting a capacitive buffer capacitor of a capacitive auto-zeroing buffer by closing and reopening a switch in parallel with the capacitive buffer capacitor at a first time and resetting the feedback capacitor of the capacitive trans-impedance amplifier by closing and reopening a switch in parallel with the feedback capacitor at a second time.

Clause 14. The method of any of clauses 12-13, wherein the second communication transmission line maintains a constant bias and no charge from parasitic capacitances is transferred to the capacitive trans-impedance amplifier.

Clause 15. The method of any of clauses 12-14, wherein the first communication transmission line is an aggressor line.

Clause 16. The method of any of clauses 12-15, wherein the second communication transmission line is a victim line.

Clause 17. The method of any of clauses 12-16, wherein the first communication transmission line and the second communication transmission line are high-speed analog communications channels.

Clause 18. The method of any of clauses 12-17, wherein the first communication transmission line and the second communication transmission line are digital communications channels.

Clause 19. The method of any of clauses 12-18, wherein the digital communications channels comprise ASICs or FPGAs.

Clause 20. The method of any of clauses 12-19, further comprising receiving, at a processor, an output from the voltage comparator circuit and determining a capacitive-based coupling.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

While the embodiments have been illustrated respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. A system for measuring parasitic capacitance coupling between a first communication transmission line and a second communication transmission line that are adjacent, the system comprising:
    a parasitic tolerant capacitive based coupling measurement circuit (CBCM), the CBCM comprising:
        a capacitive auto-zeroing buffer configured to bias the second communication transmission line and displace coupling charge transferred from the first communication transmission line to a switched capacitor storage element;
        a capacitive trans-impedance amplifier configured to integrate displaced coupling charge onto an output voltage node of the second communication transmission line; and
        a comparator configured to switch states of the capacitive trans-impedance amplifier once the capacitive trans-impedance amplifier integration has surpassed a reference trippoint.

2. The system of claim 1, further comprising a digital signal generator that provides a digital periodic signal to a receive end of the first communication transmission line.

3. The system of claim 2, wherein the digital periodic signal in the first communication transmission line induces a charge to flow in the second communication transmission line.

4. The system of claim 1, wherein the second communication transmission line maintains a constant bias and no charge from parasitic capacitances is transferred to the capacitive trans-impedance amplifier.

5. The system of claim 1, wherein the first communication transmission line is an aggressor line.

6. The system of claim 1, wherein the second communication transmission line is a victim line.

7. The system of claim 1, wherein the first communication transmission line and the second communication transmission line are high-speed analog communications channels.

8. The system of claim 1, wherein the first communication transmission line and the second communication transmission line are digital communications channels.

9. The system of claim 8, wherein the digital communications channels comprise application-specific integrated circuits (ASICs) or field programmable gate arrays (FPGAs).

10. The system of claim 1, further comprising a processor configured to receive an output from the comparator and determine a capacitive-based coupling measurement.

11. The system of claim 1, wherein the comparator is a dynamic, clocked voltage comparator.

12. A method to determine a coupling capacitance between a first communication transmission line and a second communication transmission line, the method comprising:
    providing a periodic digital signal to a first communication transmission line that induces a charge to flow in a nearby second communication transmission line, wherein the charge flows through a capacitive auto-zeroing buffer;
    integrating the charge onto a feedback capacitor of a capacitive trans-impedance amplifier when the charge is positive due to a positive change in voltage of the periodic digital signal on the first communication transmission line;

disconnecting the capacitive trans-impedance amplifier from a signal path prior to a negative charge flow due to a negative change in voltage in the periodic digital signal in the first communication transmission line;

integrating in one direction until integrated charge formulates a voltage which crosses a known threshold as measured on a voltage comparator circuit; and counting a number of cycles required to cross the known threshold to infer a coupling capacitance between the first communication transmission line and the second communication transmission line.

13. The method of claim 12, wherein prior to the providing the periodic digital signal, the method comprises resetting a capacitive buffer capacitor of a capacitive auto-zeroing buffer by closing and reopening a switch in parallel with the capacitive buffer capacitor at a first time and resetting the feedback capacitor of the capacitive trans-impedance amplifier by closing and reopening a switch in parallel with the feedback capacitor at a second time.

14. The method of claim 12, wherein the second communication transmission line maintains a constant bias and no charge from parasitic capacitances is transferred to the capacitive trans-impedance amplifier.

15. The method of claim 12, wherein the first communication transmission line is an aggressor line.

16. The method of claim 12, wherein the second communication transmission line is a victim line.

17. The method of claim 12, wherein the first communication transmission line and the second communication transmission line are high-speed analog communications channels.

18. The method of claim 12, wherein the first communication transmission line and the second communication transmission line are digital communications channels.

19. The method of claim 18, wherein the digital communications channels comprise application-specific integrated circuits (ASICs) or field programmable gate arrays (FPGAs).

20. The method of claim 12, further comprising receiving, at a processor, an output from the voltage comparator circuit and determining a capacitive-based coupling.

* * * * *